US011494883B1

United States Patent
Murdison et al.

(10) Patent No.: US 11,494,883 B1
(45) Date of Patent: Nov. 8, 2022

(54) IMAGE CORRECTION

(71) Applicant: Meta Platforms Technologies, LLC, Menlo Park, CA (US)

(72) Inventors: Thomas Scott Murdison, Seattle, WA (US); Edward Buckley, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 93 days.

(21) Appl. No.: 17/124,310

(22) Filed: Dec. 16, 2020

(51) Int. Cl.
G06T 5/00 (2006.01)
G06F 3/01 (2006.01)
G09G 5/38 (2006.01)
G09G 5/37 (2006.01)
G06T 3/00 (2006.01)

(52) U.S. Cl.
CPC ............. G06T 5/006 (2013.01); G06F 3/013 (2013.01); G06T 3/0093 (2013.01); G09G 5/37 (2013.01); G09G 5/38 (2013.01); G09G 2320/0261 (2013.01)

(58) Field of Classification Search
None
See application file for complete search history.

(56) References Cited

U.S. PATENT DOCUMENTS

| 4,587,559 A * | 5/1986 | Longacre, Jr. | G09G 5/393 348/718 |
| 5,703,637 A * | 12/1997 | Miyazaki | G02B 27/0172 348/E5.145 |
| 6,498,685 B1 * | 12/2002 | Johnson | G21K 1/06 347/241 |
| 6,916,096 B2 * | 7/2005 | Eberl | G02B 21/0028 351/209 |

(Continued)

OTHER PUBLICATIONS

Author: Blohm et al.; Title: A model that integrates eye velocity commands to keep track of smooth eye displacements; Date: Apr. 22, 2006; pp. 51-70; Source: https://link.springer.com/article/10.1007/s10827-006-7199-6 (Year: 2006).*

(Continued)

Primary Examiner — Jwalant Amin
(74) Attorney, Agent, or Firm — Baker Botts L.L.P.

(57) ABSTRACT

In one embodiment, a computing system may render an image to be output by a display which sequentially outputs pixel rows of the image at a row-to-row velocity. The system may predict, based on eye-tracking data, an eye-motion velocity within a timeframe for displaying the image. The system may determine a predicted retina projection displacement for each pixel row based on the row-to-row velocity and eye-motion velocity. The system may determine a first correction displacement for each pixel row based on the predicted retina projection displacement. The system may determine a cumulative correction displacement based on the first correction displacement. The system may deter- (Continued)

mine, for each pixel row, a second correction displacement based on the first correction displacement of that pixel row and the cumulative correction displacement. The system may warp each pixel row using the associated second correction displacement and output the warped pixel rows using the display.

20 Claims, 16 Drawing Sheets

(56) References Cited

U.S. PATENT DOCUMENTS

| | | | |
|---|---|---|---|
| 9,706,920 B2* | 7/2017 | Okada | A61B 3/152 |
| 2011/0161160 A1* | 6/2011 | Carlson | G06Q 30/02 |
| | | | 705/14.41 |
| 2012/0062584 A1* | 3/2012 | Furukawa | H04N 21/44218 |
| | | | 345/589 |
| 2016/0106354 A1* | 4/2016 | Shudo | A61B 3/0091 |
| | | | 351/210 |
| 2017/0092198 A1* | 3/2017 | Ryu | G09G 3/3275 |
| 2019/0385342 A1* | 12/2019 | Freeman | G06T 19/006 |
| 2021/0271319 A1* | 9/2021 | Lussier | A61B 3/0041 |

OTHER PUBLICATIONS

Author: Takano et al.; Title: Displacement detection is suppressed by the post-saccadic stimulus; Date: Jun. 9, 2020; pp. 11; Source: https://doi.org/10.1038/s41598-020-66216-1 (Year: 2020).*

* cited by examiner

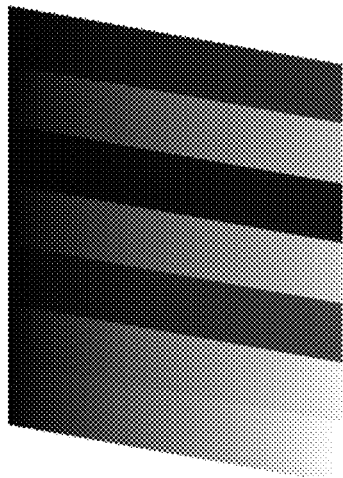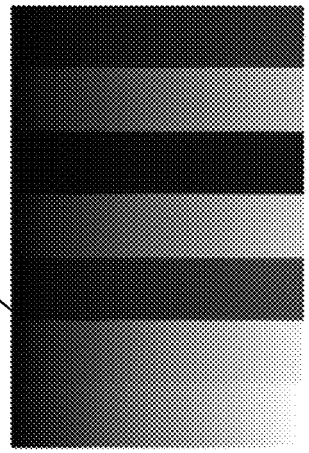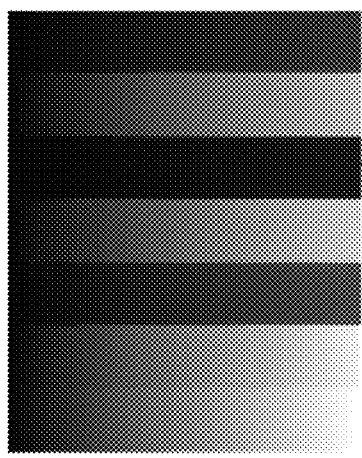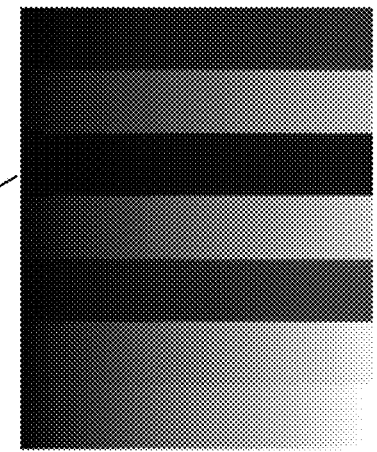
FIG. 5A
FIG. 5B

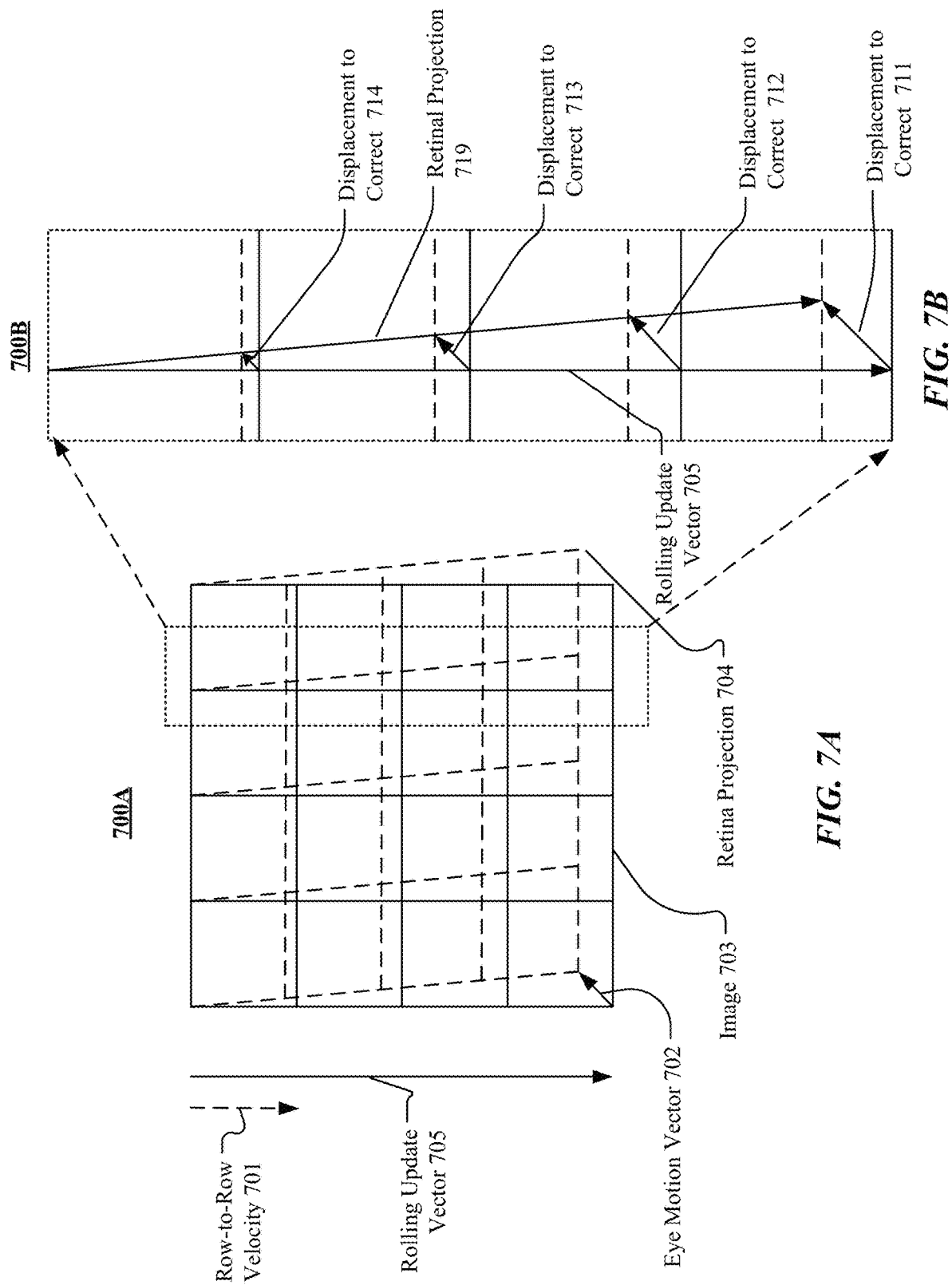

IMAGE CORRECTION

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods of using a correction mesh to pre-warp images to counteract the predicted image distortion caused by rolling update and eye motion before outputting the images to display. The system may use an eye tracking system to track the eye velocity (both magnitude and direction) and use a prediction algorithm (e.g., linear predictor or non-learning predictor) to predict the future eye velocity of the user for a series of time moments of a time period for updating next frame. For example, at the beginning moment of a frame updating process $T_0$, the system may determine an eye moving velocity (magnitude and direction) of the user's eye. Then, the system may use the eye velocity at $T_0$ to predict the eye velocity $V_{Eye}$ for a series of time moments during the time period of updating next frame. As another example, the system may use the eye tracking system to track the user's eye movement for a period of time before updating the next frame. The system may determine an eye-motion curve based on the tracked eye positions or/and velocities and use a linear or non-linear predictor and the eye-motion curve (which could be non-linear) to predict the future eye velocities $V_{Eye}$ during the time period for updating next frame.

After the predicted eye velocities are determined, the system may generate a correction mesh, which once applied to the image, can counteract the predicted image distortions (along both horizontal and vertical directions) caused by the user's eye motion and the rolling update of the display. The correction mesh may include a 2D displacement for each pixel row of the image. Each 2D displacement in the correction mesh, once applied to the corresponding pixel row of the image, may counteract the predicted distortion for that pixel row. The system may first determine a field of view (FOV) scanning velocity $V_{Display\_FOV}$ based on the field of view $f_{FOV}$ of the user corresponding to the image area and the rolling start window $T_{RSW}$ for updating a frame. The FOV scanning velocity $V_{Display\_FOV}$ may correspond to the rolling update velocity (also referred to as row-to-row velocity) of the display as measured by degree of FOV per unit time. The FOV scanning velocity may be along the vertical direction corresponding the rolling update velocity.

As an example, the system may determine the FOV scanning velocity using $V_{Display\_FOV} = [0, f_{FOV}/T_{RSW}]^T$. Then, the system may determine the predicted retina projection velocity $V_{retina\_projection}$ based on the FOV scanning velocity and the predicted eye velocity by $V_{retina\_projection} = V_{Display\_FOV} + V_{eye}$ based on geometric vector operations. The retina projection velocity $V_{retina\_projection}$ may indicate relative velocity of the displayed content being projected to the user's retina. For example, when the user's eye follows a moving object smoothly, the retina projection velocity of the displayed object may be close to zero even both the object and the user's eye are moving. For a world-locked object (i.e., stationary in the virtual or real-world), the retina projection velocity $V_{retina\_projection}$ may depend on the rolling update velocity of the display and the eye velocity (vertical or/and horizontal) of the user.

After the retina projection velocity $V_{retina\_projection}$ is determined, the system may determine the 2D retina projection displacement $d_{i,\ retina\_projection}$ for each pixel row of the image based on predicted retina projection velocity $V_{retina\_projection}$. If the predicted eye motion is linear for the time period for updating next frame, the predicted eye velocity $V_{Eye}$ and the predicted retina projection velocity $V_{retina\_projection}$ may be constant in both magnitudes and directions. The 2D retina projection displacement $d_{i,\ retina\_projection}$ for the i-th row may be determined based on the elapsed time $T_i$ from updating the first row to the i-th row and the constant retina projection velocity using $d_{i,\ retina\_projection} = T_i * V_{retina\_projection}$. The retina projection displacement of each pixel row may correspond to the predicted projection position of the that pixel row if the image is not corrected by the correction mesh. Then, the system may compare this predicted projection position of each pixel row to its corresponding ideal position as determined by the undistorted image to determine the predicted displacement $d_{i,\ displacement}$ for that pixel row caused by the rolling update of the display and the motion of the user's eye. The corresponding correction displacement in the correction mesh for i-th row may be the inverse of the predicted pixel row displacement $d_{i,correction} = d_{i,\ displacement}$. The correction displacement $d_{i,correction}$, once applied to the corresponding pixel row, may counteract the predicted pixel row displacement and eliminate or reduce the predicted distortion.

However, applying correction displacements to image pixel rows may result in an overall displacement or shift for the corrected image. As a result, the virtual object represented by the corrected image may have a position displacement with respect to the user's FOV. To solve this problem, the system may determine an overall displacement from the first row to the last row (n-th row) of the image and adjust the displacement for i-th row by the overall displacement using $d_{i,correction\_adjusted} = -(d_{i,\ correction} - \Sigma_1^N d_{i,correction})$. If the predicted eye motion is non-linear during the time period for updating next frame, the predicted eye velocity $V_{eye}$ and the predicted retina projection velocity $V_{Retina\_Projection}$ may be described by respective non-linear functions. Assuming $V_{retina\_projection} = f(t)$, where $f(t)$ is the non-linear function describing the predicted retina projection velocity over time, the predicted retina projection displacement $d_{i,\ retina\_projection}$ for i-th row may be determined based on the elapsed time $T_i$ from updating the first row to the i-th row and the time-varying retina projection velocity using $d_{i,\ retina\_projection} = \int_{T_0}^{T_i} f(t)\ dt$. After that, the system may determine the predicted pixel row displacement and the correction displacement for each pixel row and determine the overall correction displacement and adjusted correction displacement for each pixel row using the same principle as described above. After the adjusted correction displacement is determined for each pixel row, the system may apply the correction mesh to pre-warp the rendered image to counteract the predicted pixel row displacement for the time period when the frame is updated. As a result, the pre-warped image, once displayed, may eliminate or reduce the rolling update distortion (e.g., shearing distortions, vertical expansion or compression) and overall position shift as perceived by the user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5A illustrates an example image with shearing distortion caused by the rolling update of the display and the motion of the user's eye.

FIG. 5B illustrates an example image with compression distortion caused by the rolling update of the display and the motion of the user's eye.

FIGS. 7A-7B illustrate example retina projection processes for an image distorted by rolling update of the display and the eye motion of the user.

DESCRIPTION OF EXAMPLE EMBODIMENTS

Figure 1A:
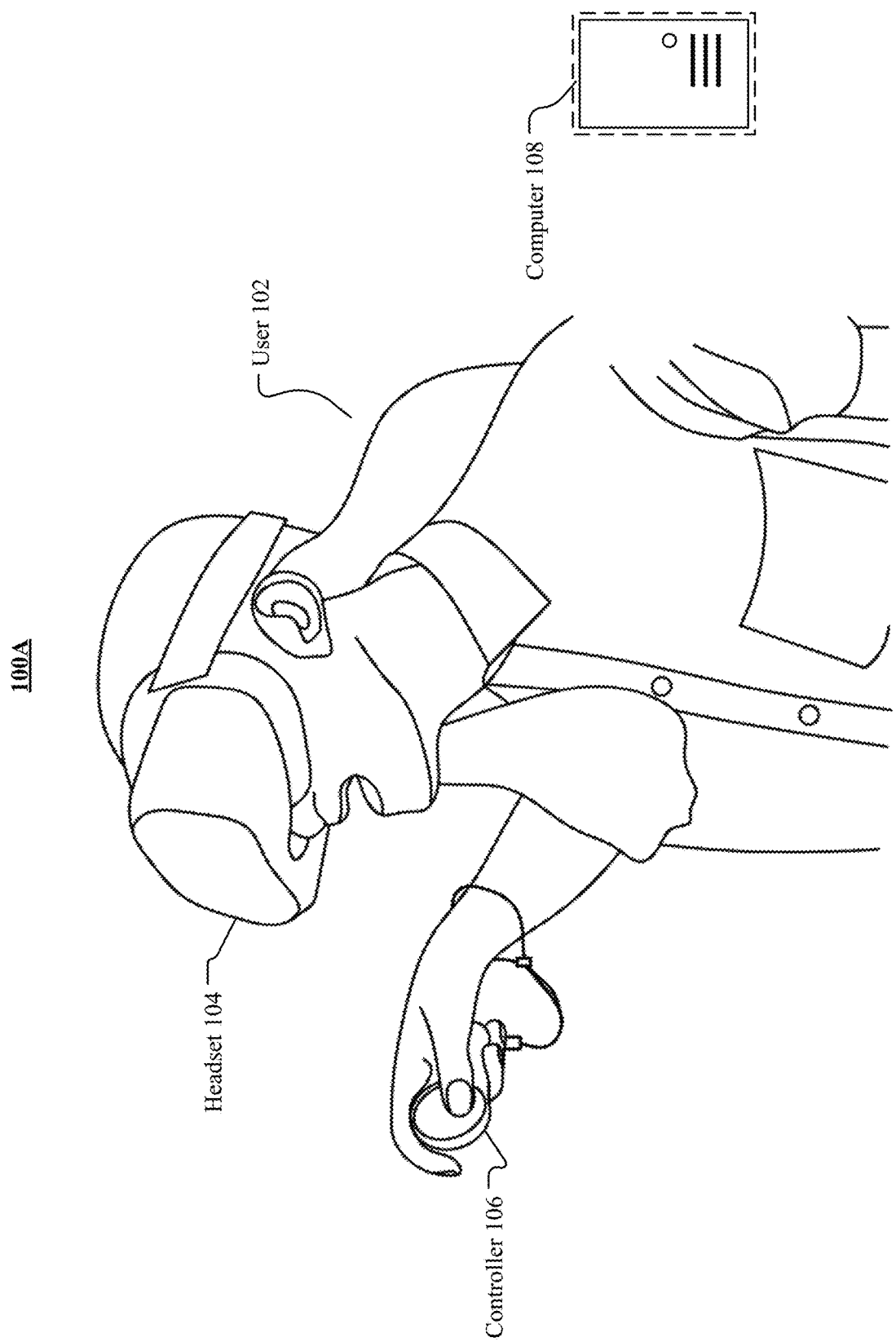
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
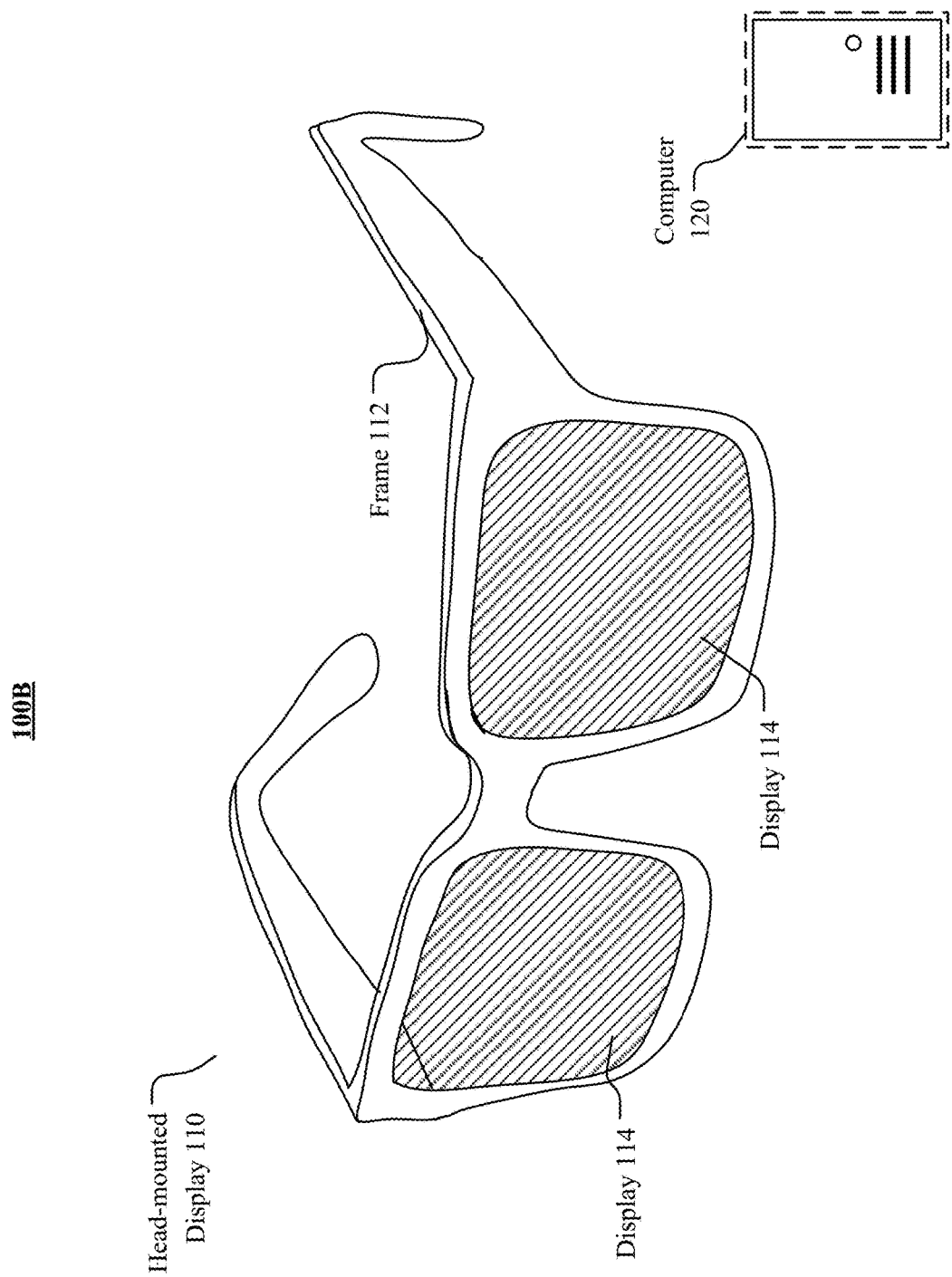
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
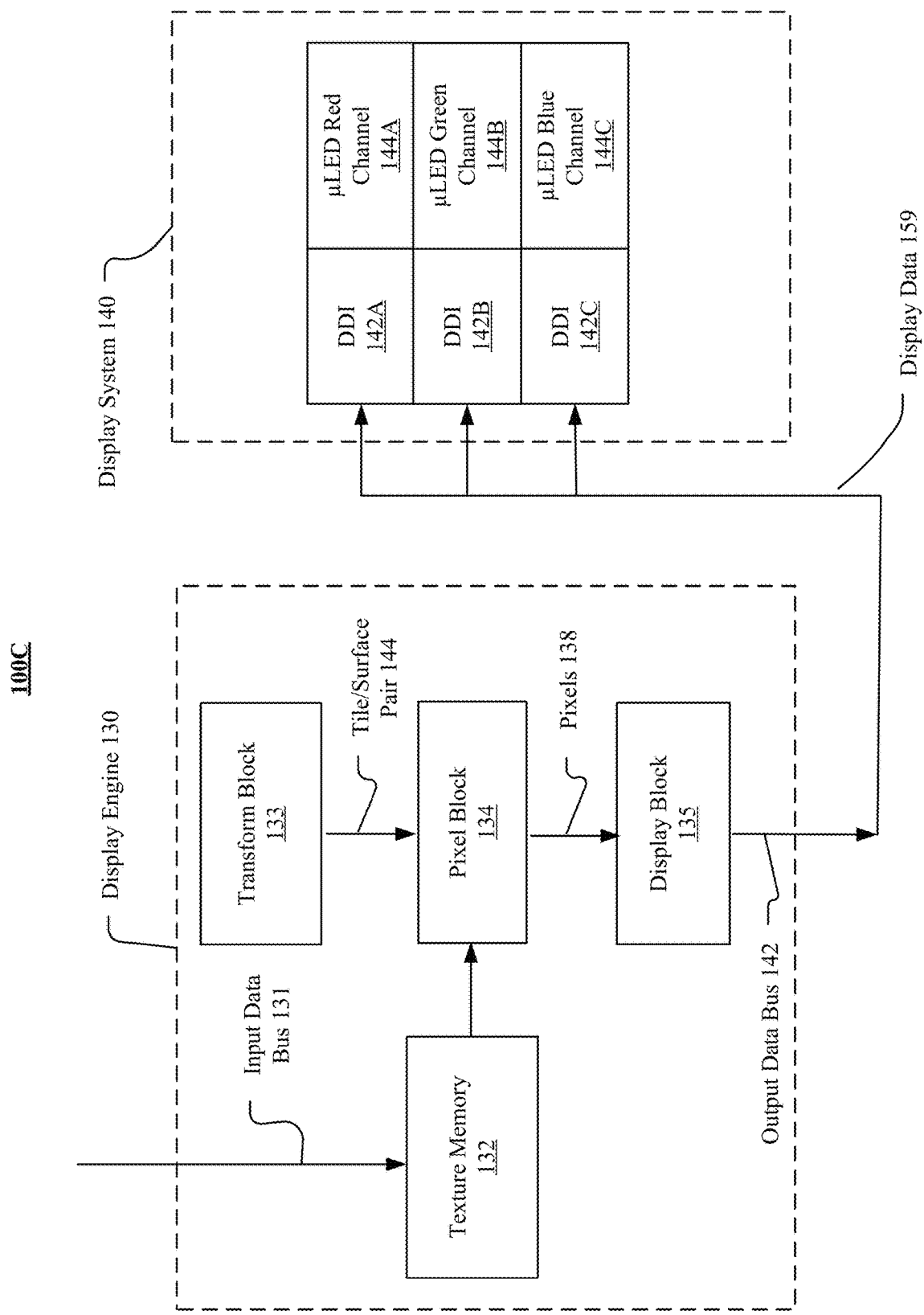
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), display degradation, etc. U.S. patent application Ser. No. 16/998,860, entitled "Display Degradation Compensation," first named inventor "Edward Buckley," filed on 20 Aug. 2020, which discloses example systems, methods, and processes for display degradation compensation, is incorporated herein by reference.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
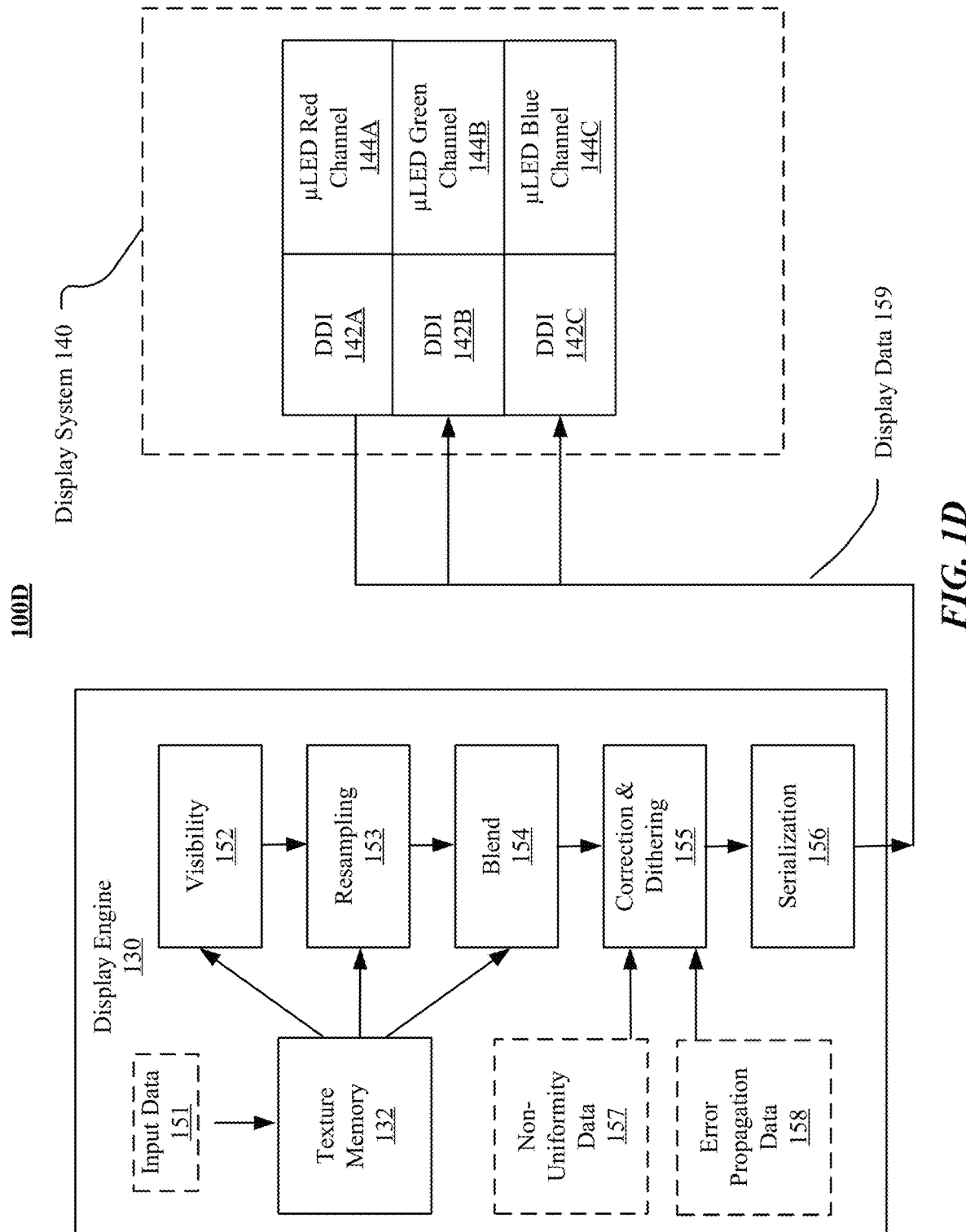
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
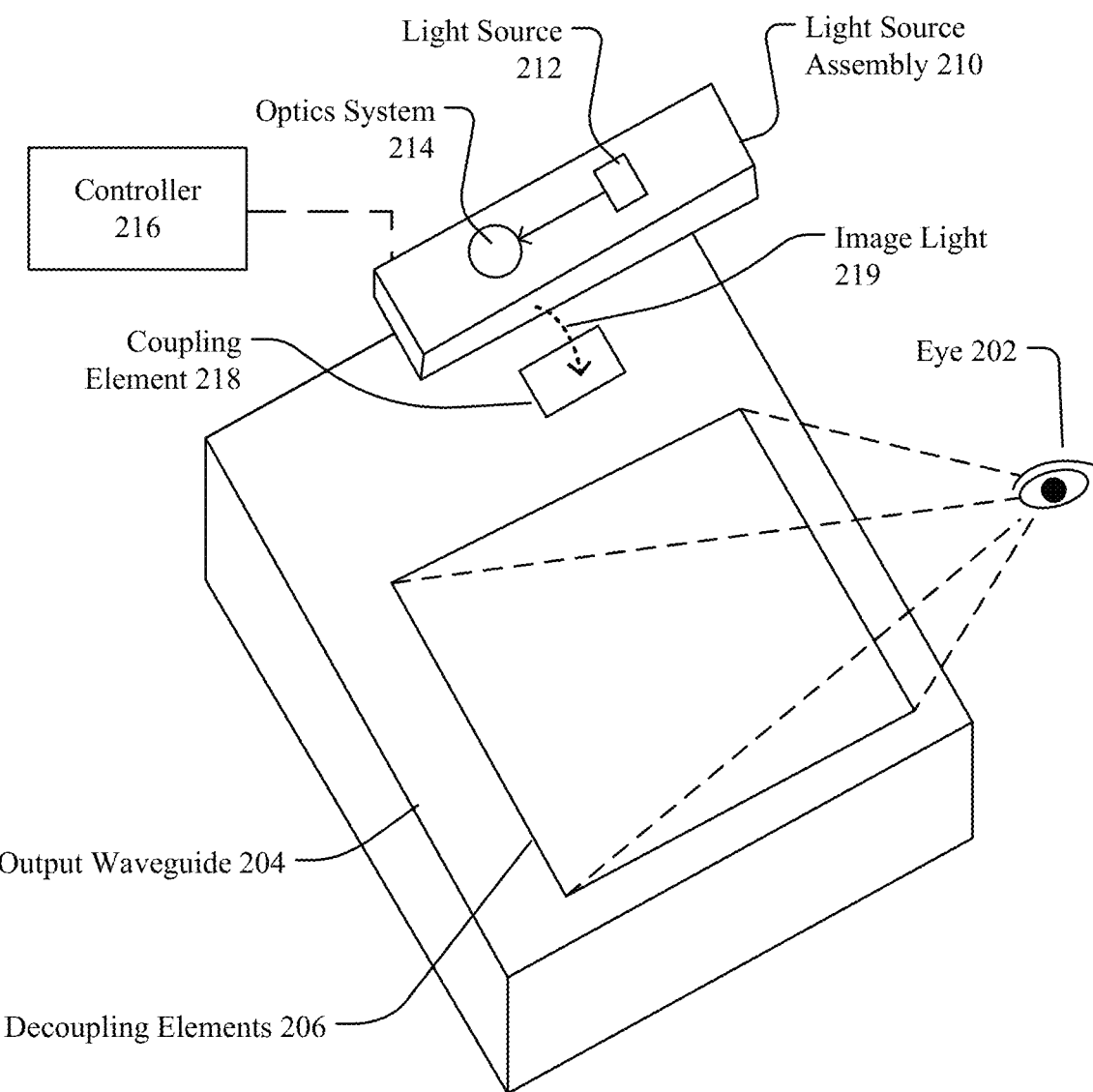
FIG. 2A illustrates an example scanning waveguide display.
Figure 3A:
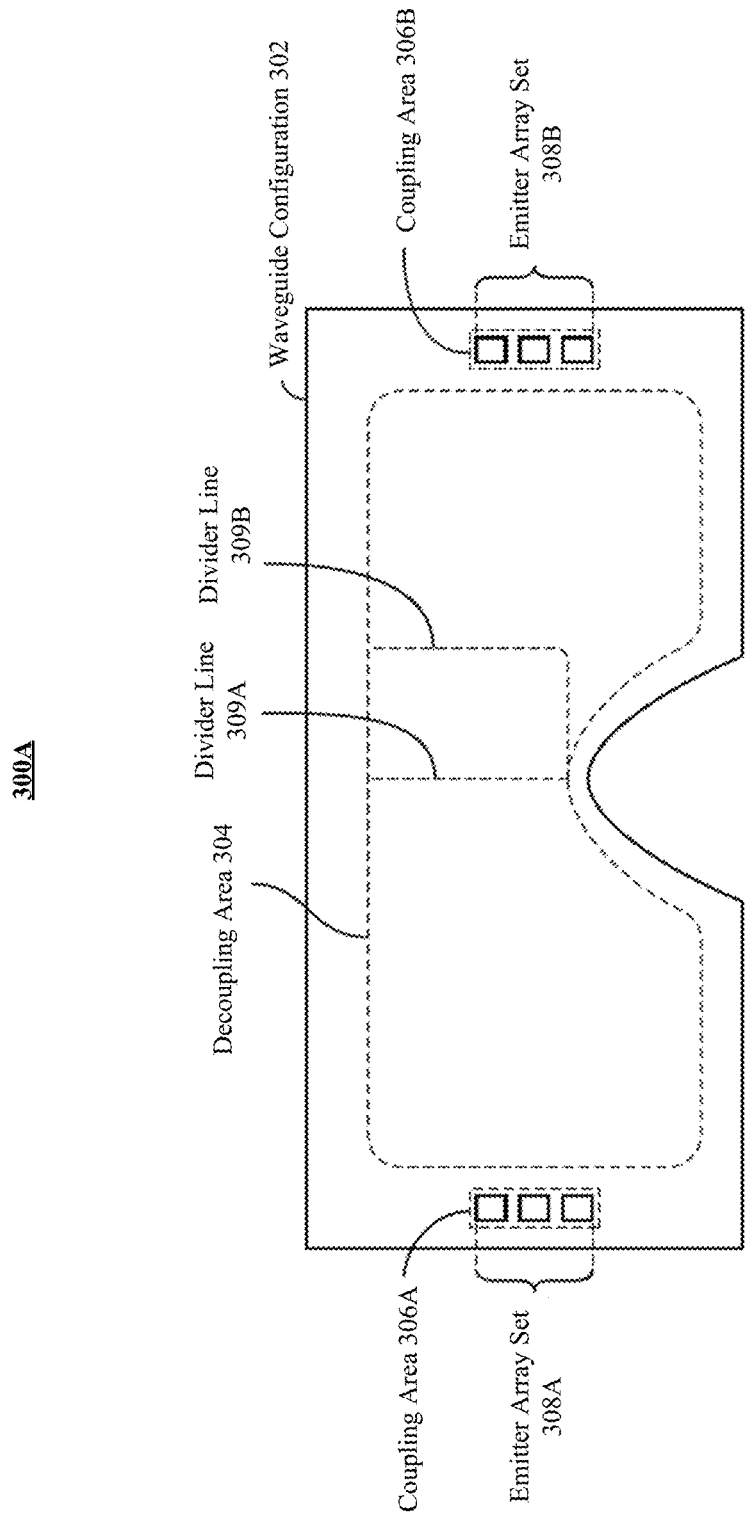
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
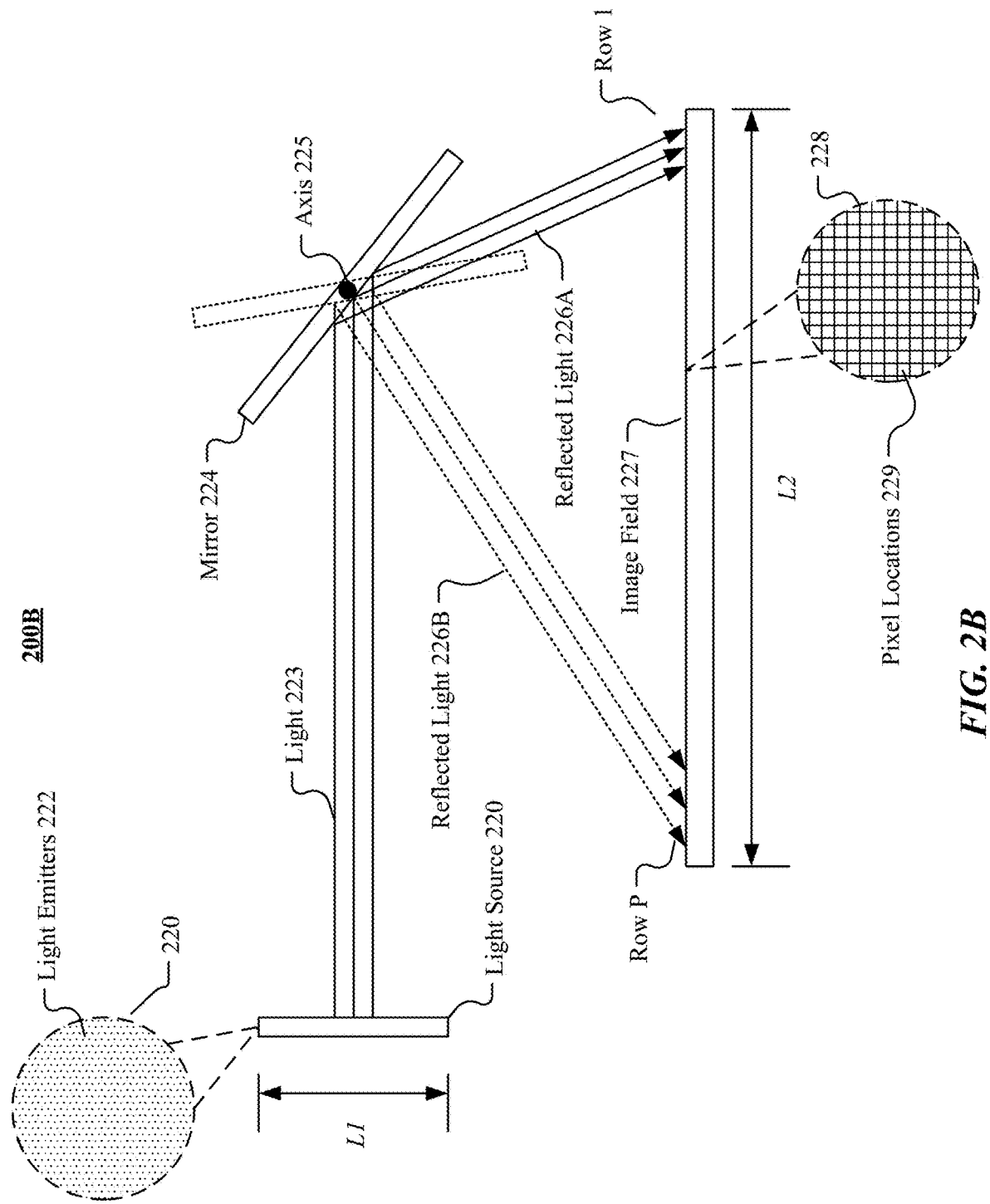
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
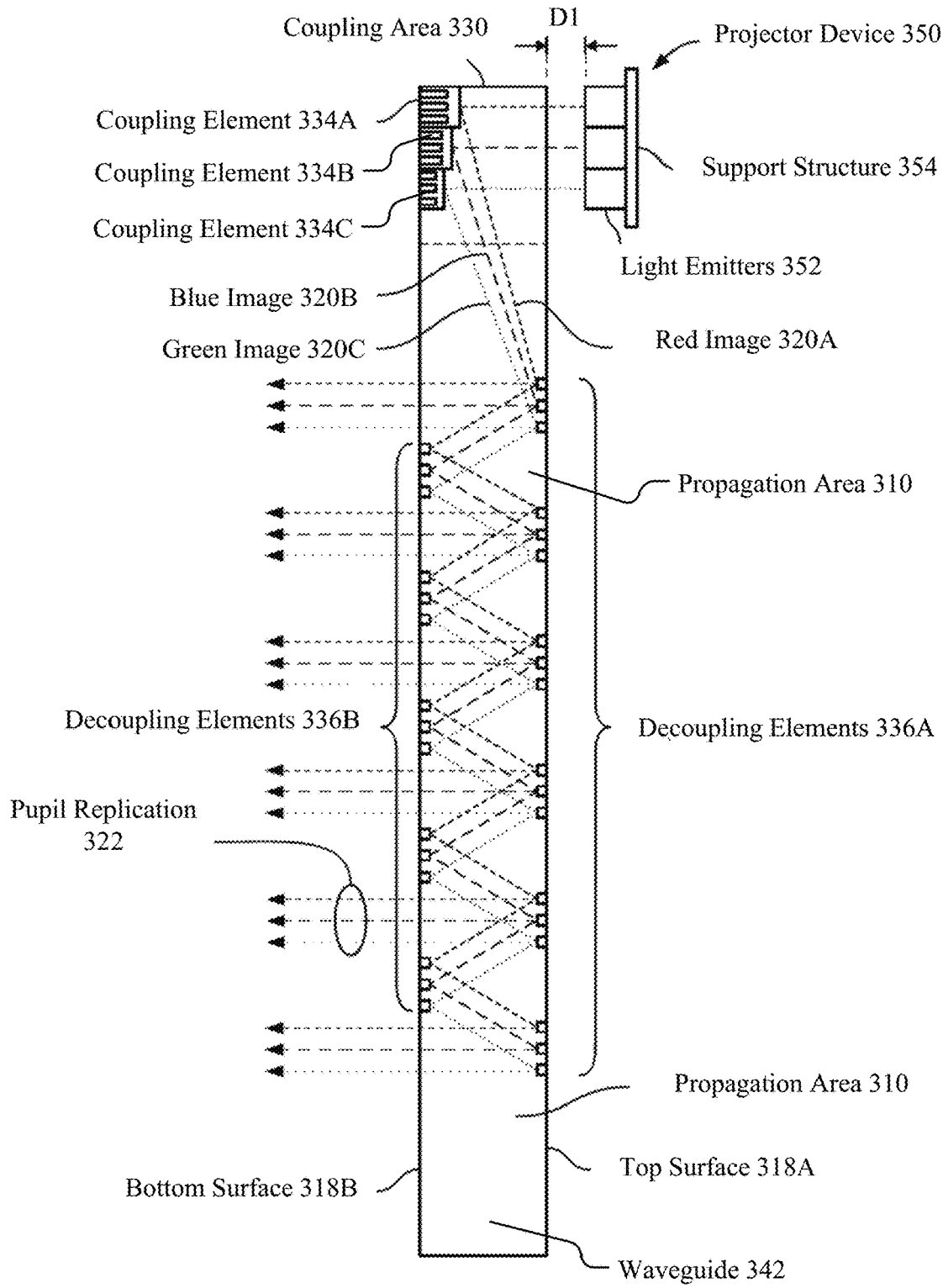
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

AR/VR systems may use a rolling-update display that update the displayed content row by row. This is fine when the user's eye is stationary. However, when the user's eye position changes while the frame is being updated row by row, the rolling update of the display and the eye motion of the user may cause the human eye to fail to properly perceive the displayed image. As a result, the displayed image may appear to be distorted (e.g., by shearing distortion, vertical compression or expansion), which may negatively affect the user experience.

In particular embodiments, then AR/VR system may use a correction mesh to pre-warp images to counteract the predicted image distortion caused by rolling update and eye motion, before outputting the images to display. The system may use an eye tracking system to track the eye velocity of the user and predict the future eye velocity. After the predicted eye velocities are determined, the system may generate a correction mesh, which once applied to the image, can counteract the predicted image distortions. The correction mesh may include a correction displacement for each pixel row of the image and each correction displacement, once applied, may counteract the predicted distortion for that pixel row. The system may first determine a FOV scanning velocity based on the field of view corresponding to the image area and the rolling update window period for updating a frame. The FOV scanning velocity may correspond to the rolling update velocity along the vertical direction as represented in FOV degrees per second. Then, the system may determine the retina projection velocity based on the FOV scanning velocity and the predicted eye velocity. The retina projection velocity may indicate relative velocity of the displayed object being projected to the user's retina.

After the retina projection velocity is determined, the system may determine the predicted displacement for each pixel row of the image based on retina projection velocity and the accumulative time from updating the first row until updating that pixel row. The correction displacement in the correction mesh for a particular row may be the inverse of the predicted pixel row displacement. The correction displacement once applied to the corresponding pixel row, may counteract the predicted pixel row displacement and eliminate or reduce the predicted distortion (e.g., shearing distortion or vertical expansion or compression). However, applying correction displacements to image pixel rows may result in an overall displacement or shift for the corrected image. As a result, the virtual object represented by the corrected image may have a position displacement with respect to its intended position in the FOV of the user. To solve this problem, the system may determine an overall displacement based on the correction displacements of all pixel rules of the image and adjust the displacement for i-th row by the overall displacement. After the adjusted correction displacement is determined for each pixel row in the correction mesh, the system may apply the correction mesh to pre-warp the rendered image to counteract the predicted pixel displacement during the time period when the frame is updated. As a result, the pre-warped image, once displayed, may eliminate or reduce the rolling update distortion (e.g., shearing distortions, vertical expansion or compression) and overall position shift as perceived by the user.

By tracking eye movement using an eye tracking system, particular embodiments of the system may generate an accurate correction mesh that can counteract the predicted image distortions caused by the rolling update of the display and the eye movement of the user. By generating and applying the correction mesh to images, particular embodiments of the system may improve the user experience by eliminating the image distortion caused by the rolling update and the user's eye movement. By counteracting the predicted image distortions, particular embodiments of the system may improve the quality of the displayed contents to the user by displaying more accurate and precise object shapes. By correcting the overall displacement, particular embodiments of the system may improve the quality of the displayed contents by displaying objects at more accurate and precise positions with respect to the FOV of the user.

Figure 4:
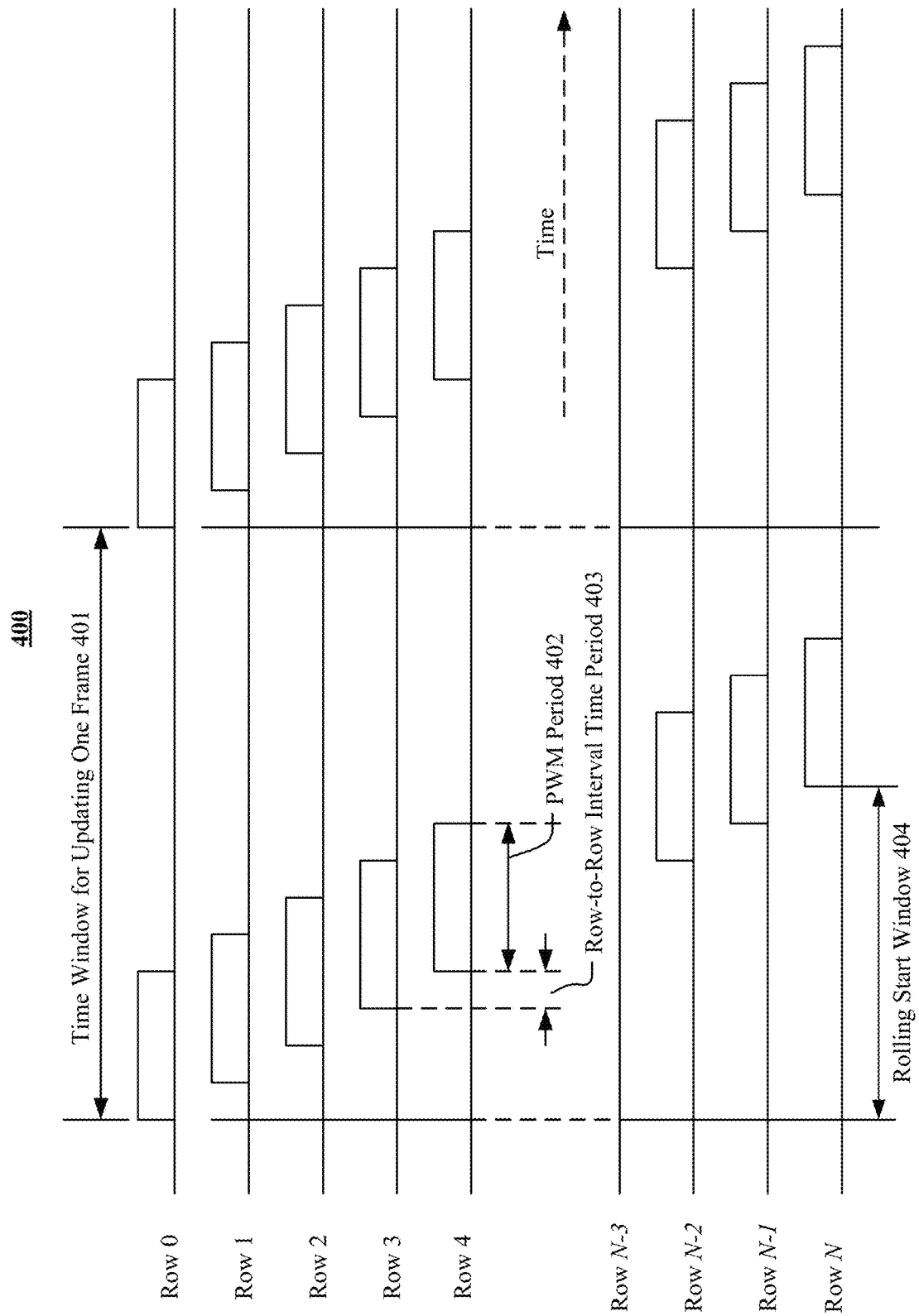
FIG. 4 illustrates an example pixel-row update process of a rolling update display.

FIG. 4 illustrates an example pixel-row update process 400 of a rolling update display. In particular embodiments, the system may use a rolling update display which may update the displayed content row by row with a particular row-to-row velocity. In particular embodiments, the rolling update display may update the pixel rows starting from the topmost row with a row-to-row velocity and vertically scan downward row by row. For example, the display may have N rows in total and these pixel rows may be updated sequentially in time row by row. Each pixel row may be updated during a corresponding PWM period (e.g., 402 for Row 4). All the pixels in the same pixel row may be updated simultaneously during the corresponding PWM period. After a pixel row is updated, the next pixel row may be updated after a row-to-row interval time period or delay time period (e.g., 403 for Row 3 to Row 4). The rolling start window 404 may start from the time moment at beginning of updating the first row and end at the time moment at beginning of updating the last row (e.g., the N-th row). The time window 401 for updating one frame may start from the time moment at beginning of updating the first pixel row (Row 0) and end at the time moment at beginning of updating the first pixel row of the next frame, covering all the PWM periods (with overlapping) for updating all pixel rows of the current frame (and the time interval period between two frames). As a result of updating pixel rows in a row-by-row manner, the pixel rows may be updated sequentially in time with each pixel row of an image being updated at a different time moment.

When the user's eye is sufficiently far from the display or is stationary, the images displayed by the rolling update display may appear to be stable. However, when the user's eye position changes while the frame is being updated row by row, the rolling update of the display and eye motion of the user may cause the human eye to fail to properly perceive the displayed image. As a result, the displayed image may appear to be distorted (e.g., by shearing distortion, vertical compression or expansion), which may negatively affect the user experience.

FIG. 5A illustrates an example image 512 with shearing distortion caused by the rolling update of the display and the motion of the user's eye. As an example and not by way of limitation, to display the image 511 on the rolling update display, the display may update the display pixel rows in a row-by-row manner starting from the topmost pixel row moving toward the bottommost pixel row. As a result, the pixel rows of the image may be displayed on the display sequentially in time during the time window that is used for displaying the whole frame. Each pixel row of the image 511 may be displayed at a different time moment with respect to other pixel rows. When the user's eye moves horizontally toward the left side with a constant velocity (e.g., a linear motion), the rolling update of the display and the eye motion may cause the user's eye to fail to integrate photon over time in a manner that a human eye normal uses to perceive the world. As a result, the displayed image 512 by the rolling display may appear to have shearing distortion (e.g., shown in 512) as perceived by the user's eye.

It is notable that the image distortion (e.g., shape and magnitude) may be depend on the actual eye motion (e.g., eye moving velocity and direction) of the user. In this example, the linear shearing distortion as shown in the distorted image 512 may correspond to the user's constant eye velocity and a fixed eye moving direction (and also the constant row-to-row velocity of the display). In this example, when the user's eye moves horizontally toward the left side with a constant velocity, the distorted image 512 may appear to have its lower end linearly sheared toward the left side. The pixel rows of the images starting from the second row from top may appear to be displaced leftward with respect to the topmost pixel row and each pixel row may be displaced by a different distance. As another example, when the user's eye move horizontally rightward with a constant velocity, the distorted image may appear to have pixel rows (starting from the second row from top) being sheared toward the right side.

FIG. 5B illustrates an example image 522 with compression distortion caused by the rolling update of the display and the motion of the user's eye. As an example and not by way of limitation, the row-to-row velocity of the rolling update display may be along the vertical direction downward. In other words, the rolling display may update the pixel rows row by row starting from the topmost row moving toward the bottommost row. When the user's eye moves vertically upward (which is the opposite to the direction of the row-to-row velocity of the display), the displayed image may appear to be compressed along the vertical direction as shown in the image 522 in FIG. 5B. Similarly, as another example, when the user's eye moves vertically downward, the displayed image may appear to be expanded along the vertical direction.

It is notable that the image distortions shown in FIGS. 5A and 5B are examples only and the images distortion is not limited thereto. In particular embodiments, the user's eye may move along an oblique direction which has a vertical component and a horizontal component. In these scenarios, the distortion of the displayed image may include both shearing distortions along horizontal direction and the compression or expansion distortion along the vertical direction. In particular embodiments, the user's eye may move with a time-varying velocity along a particular direction, the displayed image may appear to be distorted in a non-linear way according the user eye's motion. The displacements of the pixel rows may have a non-linear pattern with each row having a corresponding displacement value. In particular embodiments, the moving direction of the user's eye may be time varying. As a result, the distorted image may appear to have its pixel rows being displaced (along vertical or/and horizontal direction) along different directions. In particular embodiments, the user's eye may move arbitrarily (e.g., with both time-varying velocity and time-varying moving direction). The displayed image may appear to have arbitrary distortions according to the user's eye movement.

In particular embodiments, the system may use an eye tracking system to track the eye velocity (both magnitude and direction) and use a prediction algorithm (e.g., a linear predictor or a non-linear predictor) to predict the future eye motion (e.g., velocity with magnitude and direction, positions) of the user. In particular embodiments, the user's eye motion may be linear (i.e., moving at a constant velocity at a fixed direction). The system may use a linear predictor to predict the eye moving velocity (both magnitude and direction) or/and eye positions for a series of time moments during a time period for updating a frame of image (e.g., next frame). As an example and not by way of limitation, at the beginning time moment $T_0$ of a frame updating process, the system may use the eye tracking system to determine an eye moving velocity $V_0$ (including magnitude and moving direction) of the user's eye. Then, the system may use the eye velocity $V_0$ corresponding to the time moment $T_0$ to predict the eye velocity $V_{Eye}$ for a series of time moments during the time period of updating the next frame. When the eye motion is linear, the predicted eye velocity $V_{Eye}$ may be the same to the eye velocity $V_0$ corresponding to the time moment $T_0$ at beginning of updating the frame.

In particular embodiments, the user's eye motion may be non-linear (i.e., moving with a time-varying velocity or/and at a time-varying direction). The system may use the eye tracking system to track the user's eye movement for a period of time before updating next frame. The system may determine an eye-motion curve based on the tracked eye positions/velocities and use a non-linear predictor and the eye-motion curve (which could be non-linear) to predict the future eye velocities $V_{Eye}$ and eye positions for a series of time moments during the time period for updating next frame. In particular embodiments, the rolling update display may have a high framerate (e.g., 60 Hz, 100 Hz, 120 Hz) for displaying images and each single frame may be displayed or updated during a relative short period of time (e.g., 16.7 ms, 10 ms, 8.3 ms). Therefore, even if the user's eye motion is non-linear, the user's eye motion may be approximated by a linear motion during such a short period of time for updating the frame. As a result, the system may still able to use a linear predictor to determine the predicted eye velocity with sufficient accuracy and precision (e.g., within a pre-redetermined accuracy range and precision range).

Figure 6A:
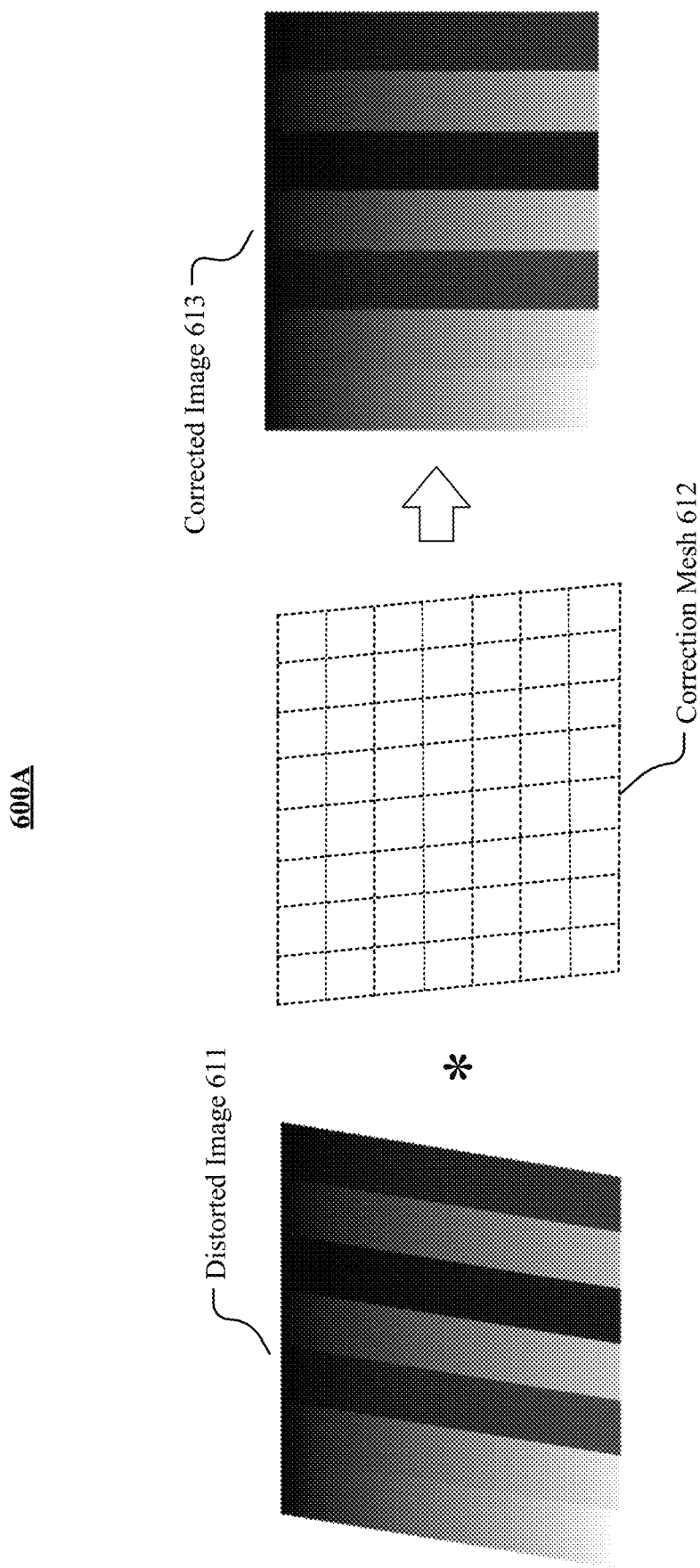
FIG. 6A illustrates an example process for correcting an image using a correction mesh.

FIG. 6A illustrates an example process 600A for correcting an image 611 using a correction mesh 612. As discussed in the earlier sections of this disclosure, the rolling update of the display and the motion of the user's eye may cause the displayed image to appear distorted to the user. In particular embodiments, before outputting the images for display, the system may generate a correction mesh based on the predicted pixel row displacement and use the correction mesh to pre-warp images to counteract the predicted image distortion caused by rolling update and eye motion. In particular embodiments, the correction mesh may include a 2D displacement for each pixel row of the image. Each 2D displacement in the correction mesh may be applied to a corresponding pixel row of the image to counteract the predicted distortion for that pixel row.

As an example and not by way of limitation, the distorted image 611 may represent what the image would look like if the correction mesh were not applied. The system may generate a correction mesh 612 for the predicted distortion in the distorted image 611 and apply the correction mesh 612 to the corresponding image before outputting it to display. The correction mesh, once applied to the image, may counteract and correct the predicted image distortions (e.g., shearing distortion, compression distortion, compression distortion). As a result, the displayed image may appear to the user without distortions (or with reduced distortions) even if the images are displayed on a rolling update display and the user's eye is moving. The corrected image 613 may represent how the image may look like to the user if the correction mesh is applied before outputting the image to display. It is notable that the correction mesh in FIG. 6A is for example purpose only and the correction mesh is not limited thereto. For example, the correction mesh may have a slope that varies from the top to the bottom depending on the actual movement of the user's eye.

In particular embodiments, the rolling update display may update the pixel rows in a row-by-row manner with a particular rolling update velocity along the vertical downward direction (i.e., starting the top row and moving to the bottom row). In particular embodiments, the rolling update velocity may be referred to as a row-to-row update velocity indicating how fast the display updates the pixel rows. In particular embodiments, the row-to-row velocity may be a fixed for updating a frame. In particular embodiments, the row-to-row velocity may be set to different values based on the system configuration.

In particular embodiments, the system may determine a field of view (FOV) scanning velocity $V_{Display\_FOV}$ of the display based on the row-to-row velocity of the display. For example, the system may first determine, from the user's perspective, the field of view $f_{FOV\_Y}$ corresponding to the image area. Then, the system may determine a rolling start window (a time period) $T_{RSW}$ for the display to update a frame. The rolling start window $T_{RSW}$ may start from the time moment corresponding to the beginning of updating the first pixel row (i.e., the topmost pixel row) and may end at the time moment corresponding to the beginning of updating the last pixel row (i.e., the bottommost row). An example rolling start window 404 is illustrated FIG. 4. The rolling start window $T_{RSW}$ of a rolling update display may depend on the row-to-row velocity of the rolling update display. A faster row-to-row velocity may correspond to a shorter rolling start window and a slower row-to-row velocity may correspond to a longer rolling start window.

In particular embodiments, the system may determine a FOV scanning velocity $V_{Display\_FOV}$ of the display which corresponds to the row-to-row update velocity of the display as measured in FOV degrees per unit time (e.g., per second). For example, the system may determine the FOV scanning velocity using the following equation:

$$V_{Display\_FOV} = [V_{Display\_FOV\_X}, V_{Display\_FOV\_Y}]^T = [0, f_{FOV_Y}/T_{RSW}]^T \quad (1)$$

where, the horizontal velocity component $V_{Display\_FOV\_X}$ is zero because the row-to-row velocity of the rolling update display is along the vertical downward direction; the vertical velocity component $V_{Display\_FOV\_Y}$ is determined by $f_{FOV_Y}/T_{RSW}$.

Figure 6B:
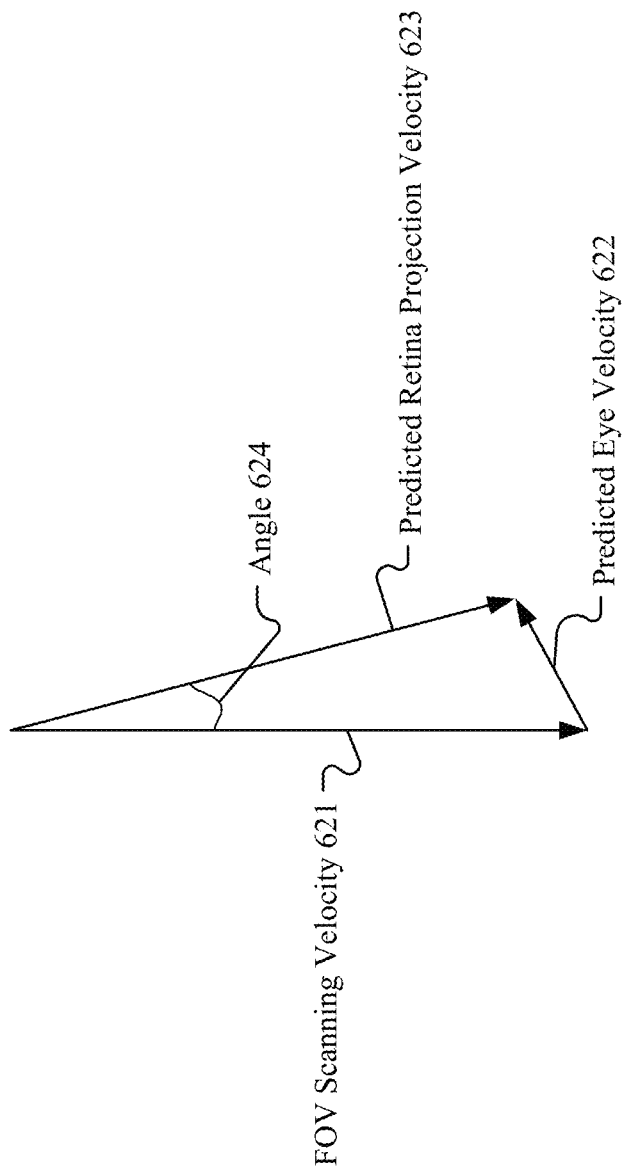
FIG. 6B illustrates an example process for determining retina projection velocity based on FOV scanning velocity and predicted eye velocity.

FIG. 6B illustrates an example process 600B for determining retina projection velocity 623 based on FOV scanning velocity 621 and predicted eye velocity 622. In particular embodiments, after determining FOV scanning velocity 621 (e.g., using Equation (1)), the system may determine a retina projection velocity $V_{Retina}$ 623 based on the FOV scanning velocity 621 of the display and the predicted eye velocity $V_{Eye}$ 622 of the user. The predicted eye velocity 622 of the user may be determined based on eye tracking data. In particular embodiments, the retina projection velocity $V_{retina}$ may indicate the relative projection velocity of a displayed content with respect to the user's retina. For example, when the user's eye smoothly follows a displayed content that is moving, the retina projection velocity of the displayed content may be zero even though both the object and the user's eye are moving. For a world-locked object (i.e., an object that is stationary with respect to a virtual world or the real world in which the object is displayed), the retina projection velocity $V_{retina}$ may be determined based on the FOV scanning velocity (which depends on the row-to-row velocity of the display and is usually fixed during a frame) and the predicted eye velocity of the user using vector operations.

As an example and not by way of limitation, the retina projection velocity $V_{Retina\_Projection}$ may be determined based on geometric vector operations using the following equation:

$$V_{retina\_projection} = V_{Display\_FOV} + V_{Eye} \quad (2)$$

where, the retina projection velocity $V_{retina\_projection}$, the FOV scanning velocity $V_{Display\_FOV}$ of the display, and the predicted eye velocity $V_{eye}$ are all vectors. In particular embodiments, the system may determine an angle 624 between the retina projection velocity 623 and the FOV scanning velocity 621 using the following equation:

$$\theta = \tan^{-1}(V_{Display\_FOV} / V_{Eye}) \quad (3)$$

It is notable that the FOV scanning velocity $V_{Display\_FOV}$ may be constant during a particular frame. When the display has a relative high frame rate (e.g., 60 Hz, 100 Hz, 120 Hz), the time period for updating each single frame may be relative short (e.g., 16.7 ms, 10 ms, 8.3 ms). During such a short time period, the user's eye motion may be approximated by a linear motion with a constant velocity and a fixed direction.

In particular embodiments, after the retina projection velocity $V_{retina\_projection}$ is determined, the system may determine a retina projection displacement corresponding to the time moment at beginning of updating each pixel row of the image. The predicted retina projection displacement for each pixel row may be a two-dimensional (2D) displacement including a vertical component representing the displacement along the vertical direction and a horizontal component representing the displacement along the horizontal direction. In particular embodiments, the retina project displacement may be determined based on the retina projection velocity $V_{Retina}$ and the time elapsed from beginning of updating the first row to the time moment corresponding to beginning of updating the current pixel row.

As an example and not by way of limitation, the user's eye may be predicted to move linearly during the time period for updating the next frame. In this scenario, the predicted eye velocity $V_{Eye}$ and consequently, the retina projection velocity $V_{retina\_projection}$ may be constant in both magnitude and direction (assuming the row-to-row velocity of the display is constant). For the i-th pixel row of the image, the system may determine a predicted retina projection displacement $d_{i,\ retina\_projection}$ based on the elapsed time $T_i$ from beginning of updating the first pixel row to the beginning of updating the i-th pixel row and the retina projection velocity $V_{Retina}$ (in both vertical and horizontal directions) using the following equation:

$$d_{i, retina\_projection} = T_i * V_{retina\_projection} \quad (4)$$

where, $T_i$ is the elapsed time from beginning of updating the first pixel row to the beginning of updating the i-th pixel row; $V_{retina\_projection}$ is the retina projection velocity during the frame. In particular embodiments, the elapsed time $T_i$ corresponding to the i-th pixel row may be determined using the following equation:

$$T_i = \frac{t_{roll}}{N_{rows}} * (i - 1) \quad (5)$$

where, the $t_{roll}$ is the rolling start window of the display (e.g., 404 in FIG. 4); $N_{rows}$ is the total number of rows to be updated; and i is the sequential number of the current row.

FIGS. 7A-7B illustrate example retina projection processes 700A and 700B for an image distorted by rolling update of the display and the eye motion of the user. As an example and not by way of limitation, the image 703, as represented by the solid-line grid, may illustrate an undistorted image to be displayed by a rolling update display. The row-to-row update velocity 701 of the display may be along the vertical downward direction. To predict the distortion caused by the rolling update and the user's eye motion, the system may need to determine the retina projection of the displayed content considering the rolling update velocity of the display and the eye velocity of the user. In particular embodiments, the system may determine the retina projection of the image by integrating over time the retina projection displacement as determined using Equation (4). Alternatively and equivalently, the system may determine the retina projection vector 719 of the displayed image based on the rolling update vector 705 and the eye motion vector 702 based on vector operations. The retina projection vector 719 may be represented as a vector indicating front line position where the rolling update process has reached. With the retina projection vector 719, the system may determine the pattern of the whole retina projection 704 corresponding to the whole image to be displayed.

Referring to FIGS. 7A-7B, the system may determine the retina projection 704 for the whole image 703 to be displayed. Then, the system may compare the retina projection 704 to the original undistorted image 703 to determine the displacement of each pixel row caused by the rolling update of the display and the user's eye motion. For example, the system may determine the displacements of 714, 713, 712, and 711, corresponding to the first, second, third, and fourth pixel row from top to bottom by comparing the rolling update vector 705 and the retina projection vector 719. It is notable that the rolling update vector 705 may correspond to an integration of the row-to-row velocity 701 over time. Therefore, in this example, the rolling update vector 705 may correspond to the vertical edge of the undistorted image 703 at the time moment corresponding to beginning of updating the last pixel row at the bottom. The eye motion vector 702 may correspond to a time integration of the eye motion velocity corresponding to the time moment at beginning of updating the last pixel row at the bottom of the image. It is notable that each displacement (e.g., 714, 713, 712, and 711) may correspond to a vector which is a time integration of the eye motion velocity until the time moment for updating that particular pixel row.

In particular embodiments, the system may determine the predicted pixel row displacement for the i-th pixel row directly based on the eye motion velocity $V_{Eye}$ and the correspond time $T_i$ that has elapsed from beginning of updating the first pixel row until beginning of updating the current pixel row, using the following equation:

$$d_{i, displacement} = T_i * V_{Eye} \quad (6)$$

It is notable that the pixel row displacement as described in Equation (6) may correspond to a displacement with respect to the topmost pixel row. In particular embodiments, the system may define a relative pixel row displacement with the displacement for each pixel row being with respect to the directly preceding pixel row. For example, for the i-th pixel row, the relative pixel row displacement $d_{i,\,displacement\_relative}$ may be defined with respect to the (i−1)-th pixel row. As a result, the pixel row displacement $d_{i,\,displacement}$ for the i-th pixel row may be an accumulative sum of the all the relative pixel row displacements for the pixel rows before the i-th pixel row.

$$d_{i,displacement} = \sum_{1}^{i-1} d_{k,displacement\_relative} \qquad (7)$$

In particular embodiments, the pixel row displacement $d_{i,\,displacement}$ as defined in this way may be referred to as an accumulative pixel row displacement.

In particular embodiments, the predicted displacement of each pixel row may correspond to a predicted distortive displacement of that pixel row, as caused by the rolling update of the display and the eye motion of the user. In particular embodiments, the system may determine a correction displacement $d_{i,correction}$ for the i-th pixel row based on the predicted displacement of that pixel row using the following equation:

$$d_{i,correction} = -d_{i,displacement} \qquad (8)$$

In other words, the correction displacement for a particular pixel row may be the inverse of the predicted distortive displacement of that pixel row. The correction displacement $d_{i,correction}$, once applied to the corresponding pixel row, may counteract the predicted distortive displacement of that pixel row and eliminate or reduce the predicted distortion caused by the rolling update of the display and the eye movement of the user.

Figure 7D:
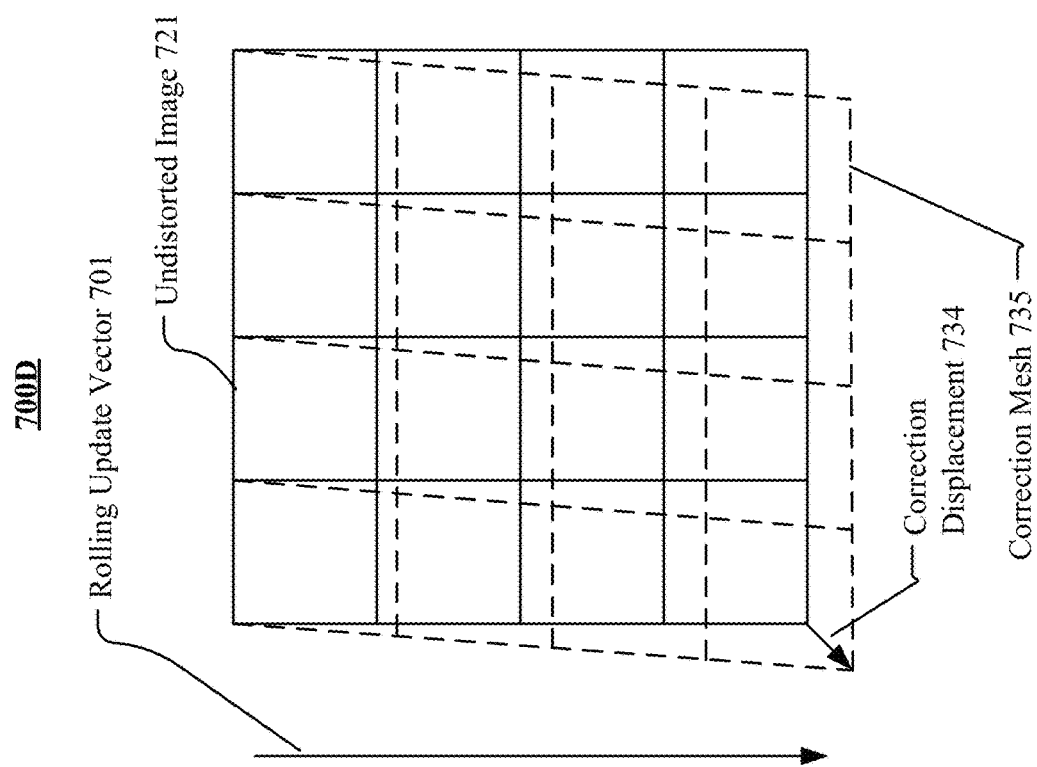
FIGS. 7C-7D illustrate an example predicted retina projection as distorted by rolling update and user's eye motion and an example correction mesh to counteract the distortion.
Figure 7C:
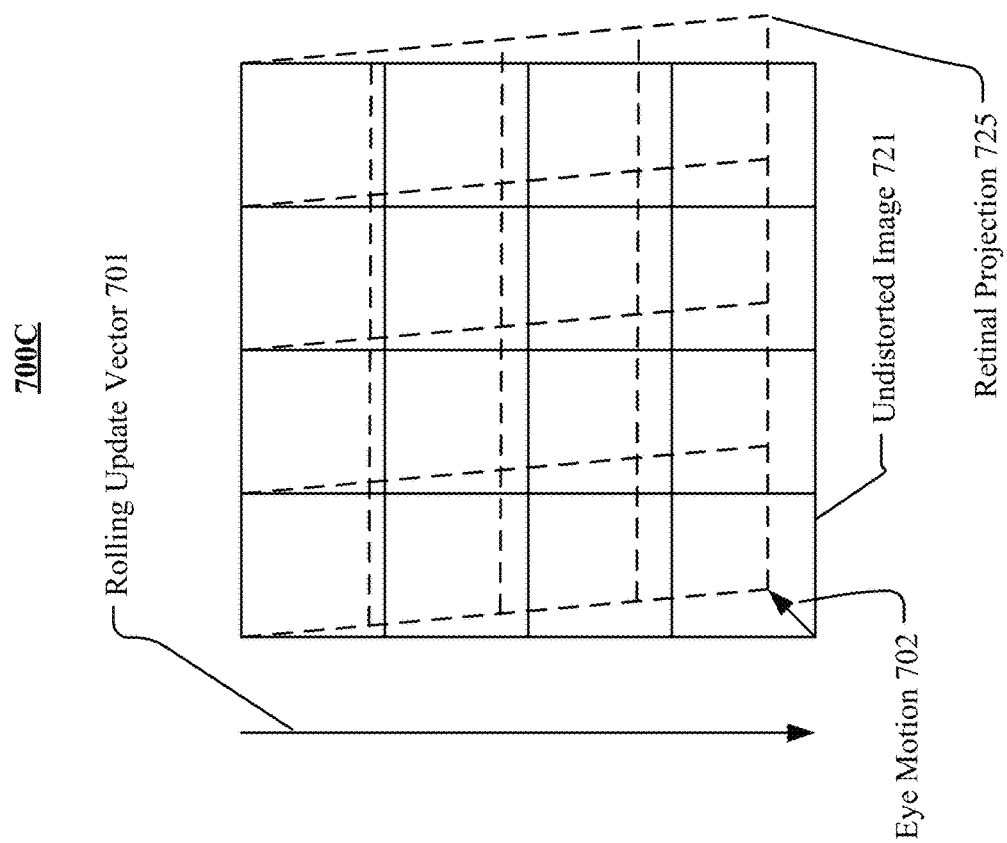

FIGS. 7C-7D illustrate an example predicted retina projection 725 as distorted by rolling update and user's eye motion and an example correction mesh 735 to counteract the distortion. As an example and not by way of limitation, the system may first determine (e.g., using the processes and principles described in the earlier sections of this disclosure) a predicted retina projection 725 for an image 721 to be displayed. The predicted retina projection 725 may be determined based on the rolling update vector 701 (or rolling update velocity) of the display and the eye motion vector 702 (or eye velocity) of the user. Then, the system may determine the predicted distortive displacement of each pixel row. After that, the system may determine the correction displacement for each pixel row of the image and generate a correction mesh 735 based on the determined correction displacements. The correction mesh 735 may include the correction displacement for each pixel row that can counteract the predicted distortive displacement of that pixel row. The correction mesh 735, once applied to the image before the image being outputted for display, may counteract the predicted distortion of the image caused by the rolling update of the display and the eye movement of the user. As a result, the displayed image may appear to be free of distortion or have reduced distortion.

However, in particular embodiments, applying correction displacements to image pixel rows may result in an overall position displacement or shift for the displayed content position. In particular embodiments, the overall position displacement or shift may be with respect to the intended display position within the FOV of the user. For example, the system may intend to display a virtual object to the user in at the center line of the FOV of the user. However, when the displayed image is updated by the rolling update display and the user's eye moves during this update time period, the displayed image, as corrected by the correction mesh, may have the virtual object position shifted to left or right side of the center line of the user's FOV based on the moving direction and velocity of the user's eye movement. In particular embodiments, the virtual object position may be displaced or shifted to an unintended position with respect to other objects in the virtual or real world.

To solve this problem, particular embodiments of the system may determine an overall pixel row displacement based on the predicted pixel displacements of all pixel rows of the image. As an example and not by way of limitation, the system may determine the overall displacement $d_{overall\_displacement}$ of the image using the following equation:

$$d_{overall\_displacement} = \sum_{i=1}^{N} d_{i,displacement\_relative} \qquad (9)$$

where, N is the total number of pixel rows of the image; $d_{i,displacement\_relative}$ is the relative pixel displacement for the i-th pixel row. In other words, the overall displacement $d_{overall\_displacement}$ of the image may an accumulative sum of the relative pixel displacements for all the pixel rows (from zero to N-th row) of the image. It is notable that when the eye motion is linear the over the overall displacement $d_{overall\_displacement}$ of the image may be equal to pixel row displacement of the last pixel row of the image.

In particular embodiments, instead of directly applying the correction displacements as determined using Equation (6) to the image to counteract the predicted distortion, the system may adjust the correction displacement for each pixel row using the overall displacement. For example, the system may adjust the displacement for i-th row by the overall displacement $d_{overall\_displacement}$ using the following equations:

$$d_{i,correction\_adjust} = -(d_{i,displacement} - d_{overall\_displacement}) \qquad (10)$$

$$d_{i,correction\_adjust} = -\left(d_{i,displacement} - \sum_{i=1}^{N} d_{i,displacement\_relative}\right) \qquad (11)$$

In particular embodiments, the system may generate a correction mesh based on the adjusted correction displacements for the pixel rows of the image as determined using Equation (10) or (11). The correction mesh may include the adjusted correction displacement for each pixel row of the image to be displayed. After the correction mesh is determined, the system may apply the correction mesh to the image to pre-warp the image to counteract the predicted distortion before outputting the image to display. As a result, the pre-warped image, once displayed, may appear to be free of distortion (e.g., shearing distortions, vertical expansion or compression) or have reduced distortion caused by the rolling update of the display. Furthermore, because the correction displacement for each pixel row is adjusted by the overall displacement, the displayed content may appear to have accurate and previse position with respect to the FOV of the user.

As an example and not by way of limitation, assuming the system has a rolling update display which has 1000 rows of screen pixels, the display may need 10 ms to update from the topmost pixel row to the bottommost pixel row during a frame at a 100 Hz frame rate. The rolling start window of the display may be 10 ms which may be approximately equal to the total frame time (about 10 ms). The display may work in a rolling update mode across the vertical dimension only and the horizontal dimension may be assumed to be globally illumined at the same time when each row is updated. In other words, the rolling display may update the pixel rows sequentially row by row and may update all the pixels within a row simultaneously. Therefore, the horizontal component of the rolling update velocity may be zero. Using Equation (1), the system may determine the FOV scanning velocity $V_{Display\_FOV}$ as following, assuming the downward velocity is negative:

$$V_{Display\_FOV} = [0, -10,000] \text{ deg/s} \tag{12}$$

Assuming the user's eye is moving quickly upward and rightward at an eye velocity of $V_{Eye}=[1000, 1000]$ deg/s (e.g., the eye motion vector 702 in FIG. 7A), the system may determine the retina projection velocity using Equation (2) as follows:

$$V_{Retina} = [1000, -9000] \text{ deg/s} \tag{13}$$

After that, the system may determine predicted retina projection displacement across the rolling start window using Equations (4) and (5) as follows:

$$d_{i,retina} = [1000, -9000] \text{ deg/s} * 10 \text{ ms} = [10, -90] \text{ deg} \tag{14}$$

Therefore, in this example, the image may be compressed in the vertical dimension by 10 deg of FOV from the original 100 deg of FOV, resulting in a 90 deg vertical image FOV. With a constant eye velocity, this 10-degree compression may be evenly distributed across all 1000 pixel rows, giving an overlap of 0.01 deg between each row. It is notable that 0.01 deg is about 7 times of the known perceptibility threshold of 0.0013 deg for the human eye and may cause the image to be notably distorted as perceived by the human eye. Furthermore, the horizontal translation of the image may be 10 deg of FOV based on the comparison of the topmost pixel row to the bottommost pixel row, which may cause the image to have shearing distortion. Again, this 10 deg may be evenly distributed across all 1000 rows, giving a row-by-row cumulative displacement of 0.01 deg of FOV per row. Then, the system may determine the 2D retina projection displacement for each pixel row using Equations (4) and (5). For example, for the second row from top, the 2D retina projection displacement may be determined as the following:

$$d_{2,retina\_projection} = [1000, -9000] \text{ deg/s} * (2-1)*0.01 \text{ s/1000} = [0.01, -0.09] \text{ deg} \tag{15}$$

The system may compare the predicted retinal project to the undistorted image to determine the distortive displacement. After that, the system may subsequently determine the correction displacement of for each pixel row and determine the correction mesh for the whole image.

In particular embodiments, the system may use Equation (6) to directly determine the predicted distortive displacement for each pixel row based on the predicted eye motion velocity. For example, the system may determine, for the second row from top, the predicted distortive displacement as the following:

$$d_{2,displacement} = [1000, 1000] \text{ deg/s} * (2-1)*0.01 \text{ s/1000} = [0.01, 0.01] \text{ deg} \tag{16}$$

Similarly, the system may determine, for the third row from top, the predicted distortive displacement as the following:

$$d_{3,displacement} = [1000, 1000] \text{ deg/s} * (3-1)*0.01 \text{ s/1000} = [0.02, 0.02] \text{ deg} \tag{17}$$

Similarly, the system may determine, for the 1000-th row from top, the predicted distortive displacement as the following:

$$d_{1000,displacement} = [1000, 1000] \text{ deg/s} * (1000-1) * 0.01 \text{ s/1000} = [9.99, 9.99] \text{ deg} \tag{18}$$

After that, the system may determine a correction displacement for each pixel row based on the reverse of the predicted distortive displacement of that pixel row. For example, the correction displacement for the second row, the third row and the 1000-th row of the image in the above example, may be determined as the following:

$$d_{2,correction} = -[0.01, 0.01] \text{ deg} \tag{19}$$

$$d_{3,correction} = -[0.02, 0.02] \text{ deg} \tag{20}$$

$$d_{1000,correction} = -[9.99, 9.99] \text{ deg} \tag{21}$$

Accordingly, the relative pixel row displacement for each pixel row may be the same 0.01 deg in this example. Then, the system may use Equation (8) to determine for the overall displacement of the corrected image as the following:

$$d_{Overall\_Displacement} = \sum_{i=1}^{1000} d_{i,displacement\_relative} = -9.99 \text{ deg} \tag{22}$$

Accordingly, the adjusted correction displacement may be determined as the following:

$$d_{2,correction\_adjusted} = -[10, 10] \text{ deg} \tag{23}$$

$$d_{3,correction\_adjusted} = -[9.99, 9.99] \text{ deg} \tag{24}$$

$$d_{1000,correction\_adjusted} = -[0, 0] \text{ deg} \tag{25}$$

In particular embodiments, the predicted eye motion of the user may be non-linear during the time period for updating next frame, the predicted eye velocity $V_{Eye}$ and the retina projection velocity $V_{retina\_projecton}$ may be described by respective non-linear functions. Assuming $V_{Eye}=g(t)$ and $V_{Retina}=f(t)$, where $g(t)$ and $f(t)$ are the non-linear functions describing the time-varying eye velocity and retina projection velocity, the 2D retina projection displacement $d_{i,\ retina\_projection}$ for i-th row may be determined based on the elapsed time $T_i$ for updating the first row to the i-th row and the time-varying retina projection velocity using the following equation:

$$d_{i,retina\_projection} = \int_{T_0}^{T_1} f(t)dt \tag{26}$$

The remaining process for determining the correction displacement for each pixel row may follow the same methods, principles, and process as describe in earlier section of this disclosure. It is notable that 2D pixel row displacement and 2D correction displacement are for example purposes only.

The pixel row displacement and correction displacement are not limited thereto. For example, in particular embodiments, the pixel row displacement and correction displacement may be along one dimension.

Figure 8:
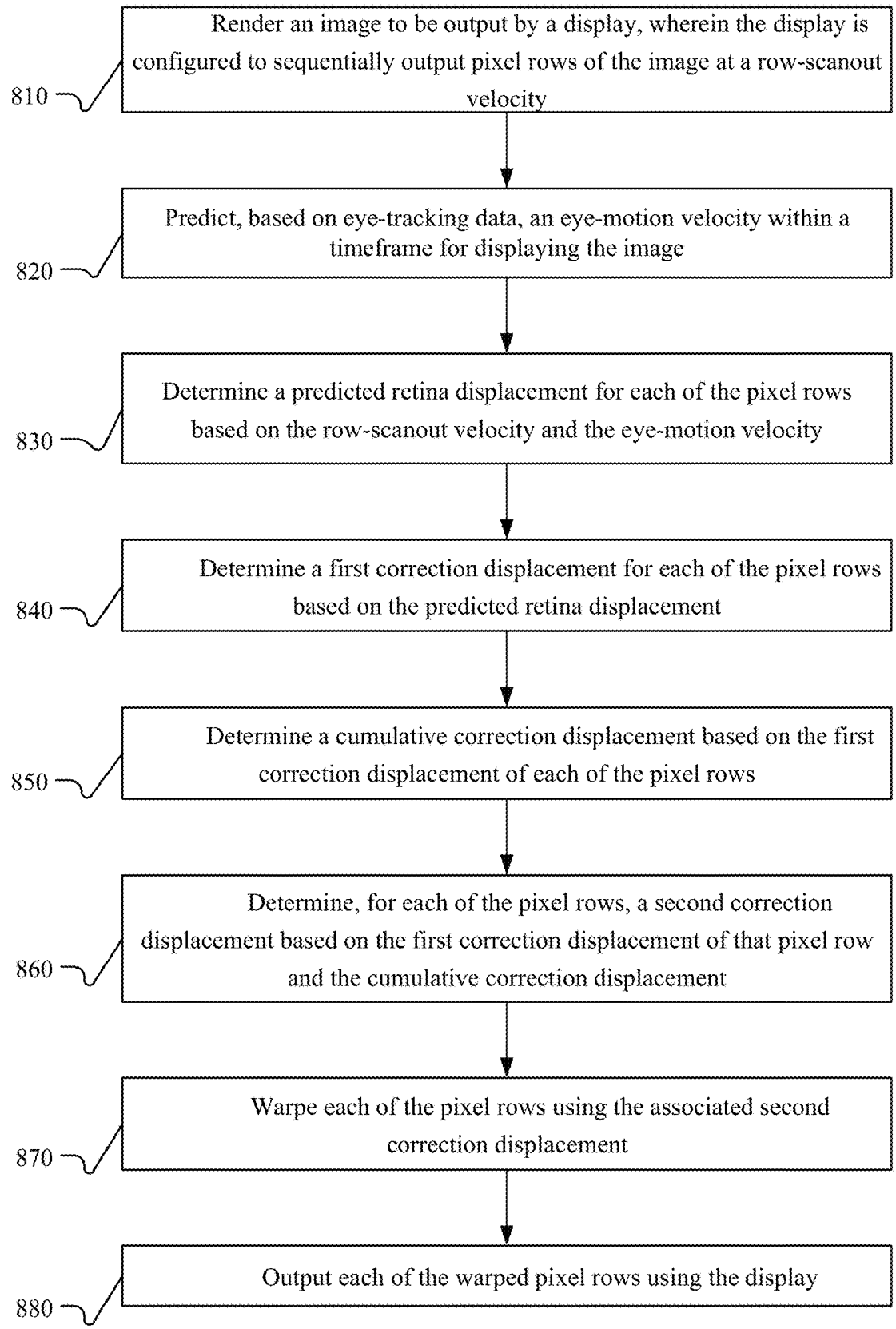
FIG. 8 illustrates an example method for correcting an image using a correction mesh.

FIG. 8 illustrates an example method 800 for correcting an image using a correction mesh. The method may begin at step 810, where a computing system may render an image to be output by a display. The display may be configured to sequentially output pixel rows of the image at a row-to-row velocity. At step 820, the system may predict, based on eye-tracking data, an eye-motion velocity within a timeframe for displaying the image. At step 830, the system may determine a predicted retina projection displacement for each of the pixel rows based on the row-to-row velocity and the eye-motion velocity. At step 840, the system may determine a first correction displacement for each of the pixel rows based on the predicted retina projection displacement. At step 850, the system may determine a cumulative correction displacement based on the first correction displacement of each of the pixel rows. At step 860, the system may determine, for each of the pixel rows, a second correction displacement based on the first correction displacement of that pixel row and the cumulative correction displacement. At step 870, the system may warp each of the pixel rows using the associated second correction displacement. At step 880, the system may output each of the warped pixel rows using the display.

In particular embodiments, the predicted retina projection displacement may be determined based on a retina projection velocity with respect to a displayed content position in a virtual space. The retina projection velocity may be determined based on the row-to-row velocity of the display and the eye-motion velocity. In particular embodiments, the predicted retina projection displacement may be determined by integrating the retina projection velocity over time. The retina projection velocity may follow a linear function or a non-linear function. In particular embodiments, a shape of a displayed content may correspond to an intended shape of the displayed content. One or more predicted distortions may be eliminated by warping the pixel rows using the associated second corrections.

In particular embodiments, a position of a displayed content may correspond to an intended position for that displayed content with respect to a field of view of the user. A predicted position displacement of the displayed content may be eliminated by warping the pixel rows using the associated second corrections. In particular embodiments, the second correction displacement may be determined by offsetting the first correction displacement by the cumulative correction displacement. In particular embodiments, the second correction displacement may depend on a relative vertical position associated with that pixel row with respect to other pixel rows of the image. In particular embodiments, the second correction displacement may have a first component along a first dimension and a second component along a second dimension that is perpendicular to the first dimension. In particular embodiments, the first correction displacement and the second correction displacement are along one dimension. In particular embodiments, the predicted retinal projection displacement may be with respect to an intended field of view of the user. In particular embodiments, the row-to-row velocity of the display may be along a rolling update direction of the display.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for correcting an image using a correction mesh including the particular steps of the method of FIG. 8, this disclosure contemplates any suitable method for correcting an image using a correction mesh including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
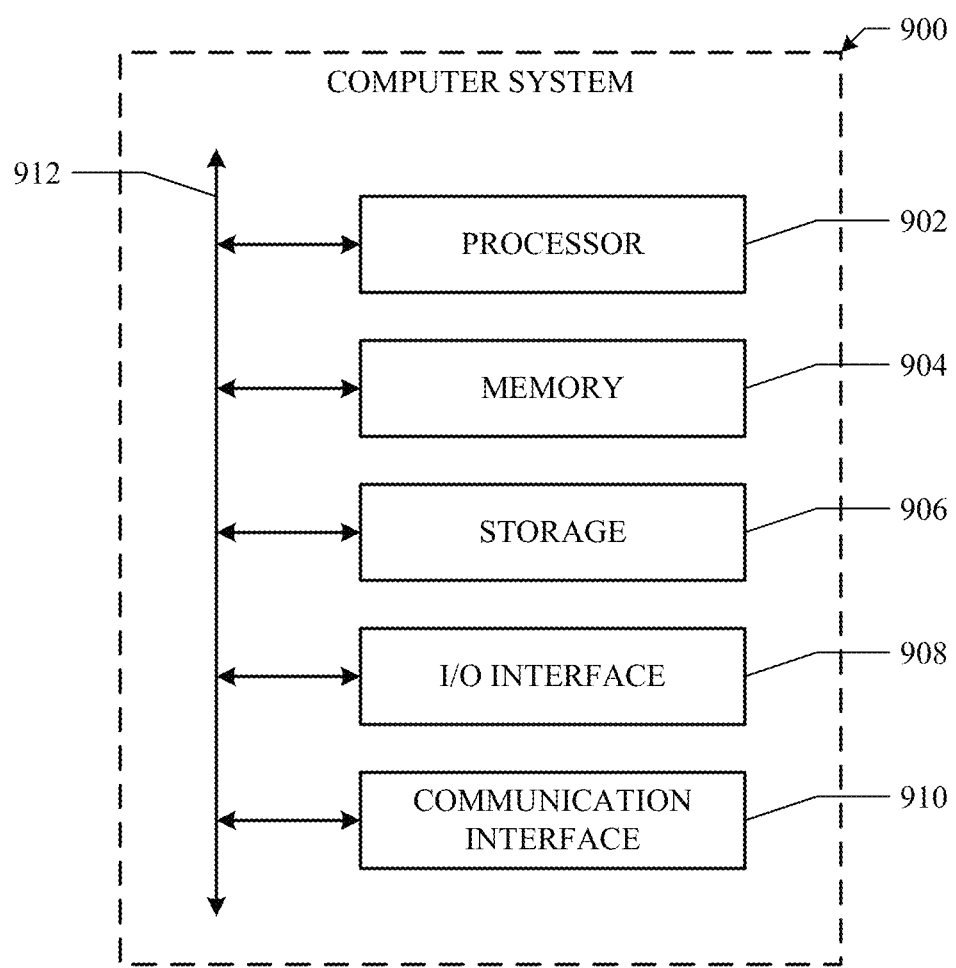
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    rendering an image to be output by a display, wherein the display is configured to sequentially output pixel rows of the image at a row-to-row velocity;
    predicting, based on eye-tracking data, an eye-motion velocity within a timeframe for displaying the image;
    determining a predicted retina projection displacement for each of the pixel rows based on the row-to-row velocity and the eye-motion velocity;
    determining a first correction displacement for each of the pixel rows based on the predicted retina projection displacement;
    determining a cumulative correction displacement based on the first correction displacement of each of the pixel rows;
    determining, for each of the pixel rows, a second correction displacement based on the first correction displacement of that pixel row and the cumulative correction displacement;
    warping each of the pixel rows using the associated second correction displacement; and
    outputting each of the warped pixel rows using the display.

2. The method of claim 1, wherein the predicted retina projection displacement is determined based on a retina projection velocity with respect to a displayed content position in a virtual space, and wherein the retina projection velocity is determined based on the row-to-row velocity of the display and the eye-motion velocity.

3. The method of claim 2, wherein the predicted retina projection displacement is determined by integrating the retina projection velocity over time, and wherein the retina projection velocity follows a linear function or a non-linear function.

4. The method of claim 1, wherein a shape of a displayed content corresponds to an intended shape of the displayed content, and wherein one or more predicted distortions are eliminated by warping the pixel rows using the associated second corrections.

5. The method of claim 1, wherein a position of a displayed content corresponds to an intended position for that displayed content with respect to a field of view of the user, and wherein a predicted position displacement of the displayed content is eliminated by warping the pixel rows using the associated second corrections.

6. The method of claim 1, wherein the second correction displacement is determined by offsetting the first correction displacement by the cumulative correction displacement.

7. The method of claim 1, wherein the second correction displacement depends on a relative vertical position associated with that pixel row with respect to other pixel rows of the image.

8. The method of claim 1, wherein the second correction displacement has a first component along a first dimension and a second component along a second dimension that is perpendicular to the first dimension.

9. The method of claim 1, wherein the first correction displacement and the second correction displacement are along one dimension.

10. The method of claim 1, wherein the predicted retina projection displacement is with respect to an intended field of view of the user.

11. The method of claim 1, wherein the row-to-row velocity of the display is along a rolling update direction of the display.

12. One or more computer-readable non-transitory storage media embodying software that is operable when executed to:
- render an image to be output by a display, wherein the display is configured to sequentially output pixel rows of the image at a row-to-row velocity;
- predict, based on eye-tracking data, an eye-motion velocity within a timeframe for displaying the image;
- determine a predicted retina projection displacement for each of the pixel rows based on the row-to-row velocity and the eye-motion velocity;
- determine a first correction displacement for each of the pixel rows based on the predicted retina projection displacement;
- determine a cumulative correction displacement based on the first correction displacement of each of the pixel rows;
- determine, for each of the pixel rows, a second correction displacement based on the first correction displacement of that pixel row and the cumulative correction displacement;
- warp each of the pixel rows using the associated second correction displacement; and
- output each of the warped pixel rows using the display.

13. The media of claim 12, wherein the predicted retina projection displacement is determined based on a retina projection velocity with respect to a displayed content position in a virtual space, and wherein the retina projection velocity is determined based on the row-to-row velocity of the display and the eye-motion velocity.

14. The media of claim 13, wherein the predicted retina projection displacement is determined by integrating the retina projection velocity over time, and wherein the retina projection velocity follows a linear function or a non-linear function.

15. The media of claim 12, wherein a shape of a displayed content corresponds to an intended shape of the displayed content, and wherein one or more predicted distortions are eliminated by warping the pixel rows using the associated second corrections.

16. The media of claim 12, wherein a position of a displayed content corresponds to an intended position for that displayed content with respect to a field of view of the user, and wherein a predicted position displacement of the displayed content is eliminated by warping the pixel rows using the associated second corrections.

17. A system comprising:
one or more processors; and
one or more computer-readable non-transitory storage media coupled to one or more of the processors and comprising instructions operable when executed by one or more of the processors to cause the system to:
- render an image to be output by a display, wherein the display is configured to sequentially output pixel rows of the image at a row-to-row velocity;
- predict, based on eye-tracking data, an eye-motion velocity within a timeframe for displaying the image;
- determine a predicted retina projection displacement for each of the pixel rows based on the row-to-row velocity and the eye-motion velocity;
- determine a first correction displacement for each of the pixel rows based on the predicted retina projection displacement;
- determine a cumulative correction displacement based on the first correction displacement of each of the pixel rows;
- determine, for each of the pixel rows, a second correction displacement based on the first correction displacement of that pixel row and the cumulative correction displacement;
- warp each of the pixel rows using the associated second correction displacement; and
- output each of the warped pixel rows using the display.

18. The system of claim 17, wherein the predicted retina projection displacement is determined based on a retina projection velocity with respect to a displayed content position in a virtual space, and wherein the retina projection velocity is determined based on the row-to-row velocity of the display and the eye-motion velocity.

19. The system of claim 18, wherein the predicted retina projection displacement is determined by integrating the retina projection velocity over time, and wherein the retina projection velocity follows a linear function or a non-linear function.

20. The system of claim 17, wherein a shape of a displayed content corresponds to an intended shape of the displayed content, and wherein one or more predicted distortions are eliminated by warping the pixel rows using the associated second corrections.

* * * * *